March 15, 1955  L. R. WOODWORTH  2,704,089

GAS TURBINE DIFFUSER

Filed June 9, 1952

INVENTOR.
Lee R. Woodworth
BY

United States Patent Office 2,704,089
Patented Mar. 15, 1955

2,704,089
GAS TURBINE DIFFUSER

Lee R. Woodworth, Los Angeles, Calif., assignor, by mesne assignments, to the United States of America as represented by the Secretary of the Navy Application June 9, 1952, Serial No. 292,421

5 Claims. (Cl. 138—37)

This invention relates to a gas turbine plant with special reference to apparatus for securing uniform air conditions at the inlet of the combustion chamber.

In air compressors there is a progressive tendency of the air flow to move away from the outer compressor wall, due to the thickening of a boundary layer arising from radial air pressures. As a result, at the compressor exit there is little energy in the wall air layer, the energy being concentrated in a middle region between the upper and lower compressor walls. Thus, there is a lack of uniformity in the flow through the diffuser and the succeeding combustion chamber.

Generally stated, the invention comprises use in a gas turbine plant of rings having an airfoil cross section placed in the diffuser air stream, the chord inclination and convexity being such as to divert a large volume of the air flow toward the walls, thereby securing a more uniform density distribution in the intake of and within the combustion chamber.

An important object of the present invention, therefore, is to provide distributing means for the air flow in the region approaching the inlet to the turbine combustion chamber. An object, also, is to provide means for obtaining a radial distribution of a non-uniform air flow in turbine diffusers. Still another object is to provide means for obtaining by static means a uniform air flow in the gas diffuser at the entrance to the combustion chamber inlet.

Other objects and many of the attendant advantages of this invention will be readily appreciated as the same becomes better understood by reference to the following detailed description when considered in connection with the accompanying drawings, wherein.

Figure 1:
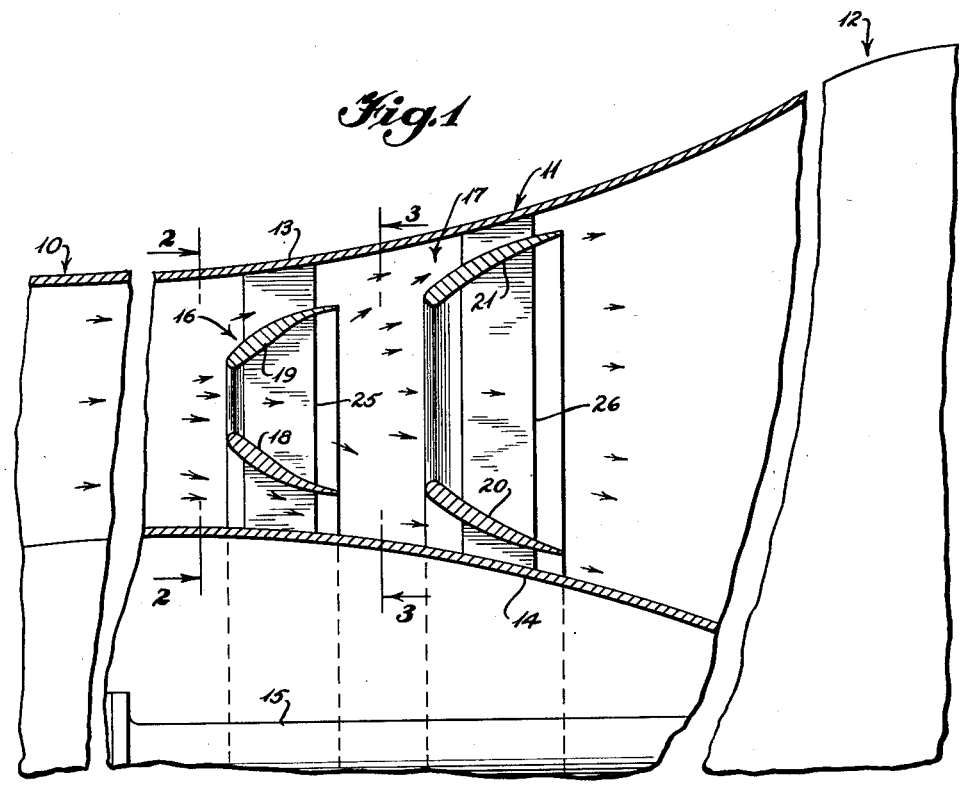
Fig. 1 is a longitudinal section through a segment of the annular diffuser.
Figure 2:
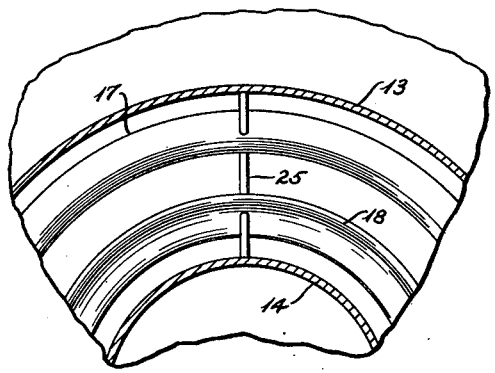
Fig. 2 is a cross section through one side of the diffuser taken on lines 2—2 of Fig. 1.
Figure 3:
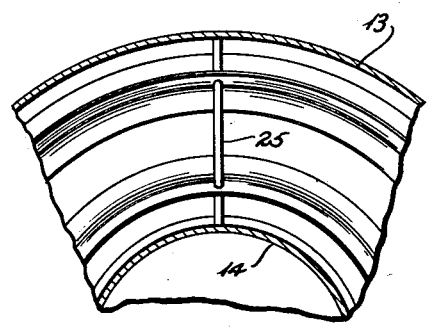
Fig. 3 is a further section taken on lines 3—3 of Fig. 1.

Fig. 1 illustrates the familiar sequence in gas turbine plant including an axial compressor 10, an annular diffuser 11 and a combustion chamber 12. The compressor may be of any form which tends to build up a boundary layer on the compressor wall due to adverse pressure gradients, the axial compressor being typical. The diffuser is formed by the outer tubular turbine casing 13 and an inner tubular drum or casing 14 supported on the turbine frame work by any appropriate means, this drum enclosing the compressor shaft 15. As shown, the diffuser walls are divergent from the compressor to the combustion chamber in order to build up pressure at the intake port to the combustion chamber. Within this divergent space are placed two pairs of rings, 16 and 17, each ring having a streamlined airfoil contour suitable for air flow diversion with reduced frictional resistance. As shown in Fig. 1, the two pairs of rings are spaced axially in the diffuser 11.

Ring pair 16 includes inner ring 18, concentric with inner casing 14 and of a diameter such as to place the ring approximately one third the radial distance from the inner to the outer casing. The outer ring 19 of pair 16 is spaced about one third the intercasing distance from the outer casing 13. These two rings are coplanar at the corresponding chord tips, the chord dimension being identical. Also the profiles of the two rings are similar but reversed, that is, inner ring 18 has a profile with the inner surface and mean camber line convex relative to inner casing 14, and outer ring 19 has an outer profile and mean camber line convex relative to the outer casing 13, thus producing, in conjunction with the surface convexities, a smooth divergence of airflow toward the diffuser walls. The chords or airfoils 18 and 19 diverge downstream in the direction of the combustion chamber, at an angle greater than that of the adjacent diffuser walls.

Ring pair 17 is located downstream from pair 16 from about one to two chord lengths of rings 18, 19. Preferably, the inner ring 20 is nearer casing wall 14 than corresponding ring 18 of pair 16, and outer ring 21 is nearer outer casing 13 than corresponding ring 19. Also, the camber of rings 20 and 21 is less, and the chord length greater, than the rings of pair 16, the divergence angle being the same as pair 16 or slightly varied therefrom.

The rings as described are supported between casing walls 13 and 14 by means of circumferentially spaced struts 25 and 26 so that the rings are rigidly positioned at the desired relationship to each other and to the enclosing walls. The rings and struts can be of light sheet metal construction, adding very little to the total weight of the machine.

The operation of the modified diffuser will now be described. Air, projected into the diffuser 11 by the air compressor 10, is more or less axially centered as hereinabove described, thus distorting the uniformity of flow entering the combustion chamber. As this incoming flow strikes the more closely spaced rings 18 and 19, a large fraction of the air is diverted outwardly by the ring profiles toward the relatively dead wall space. Part of this diverted air flow moves adjacent the wall and part strikes the second set of rings causing second but lesser diversion of the flow toward the diffuser walls. As a result, on arriving at the combustion chamber port the entire radial port space is filled with active air flow of substantially uniform density and energy distribution, thus contributing to efficient combustion in the chamber 12.

Obviously many modifications and variations of the present invention may be made, such as adjustment of the ring operation of each pair, the number of the ring pairs, the spacing of the ring pairs and changes in the chord length, camber and chord inclination to the casing walls. It is therefore to be understood that within the scope of the appended claims the invention may be practiced otherwise than as specifically described.

What is claimed is:

1. In a diffuser having concentric annular walls, static means for securing uniform radial air distribution at the outlet of said diffuser comprising at least two streamlined rings of different diameters positioned in said diffuser in concentricity to the diffuser axis, one ring having a convex surface next adjacent the outer diffuser wall and the other ring having a convex surface next adjacent the inner diffuser wall, said convex surfaces extending the entire chord length of said rings, and means for supporting said rings, said rings being spaced radially with reference to the diffuser axis from each other and from the diffuser walls for free flow of air therebetween.

2. The air distribution means as defined in claim 1, the air distributing rings having a chord inclination diverging toward the next adjacent diffuser walls in the direction of air flow through the diffuser.

3. The air distributor as defined in claim 1 with a second pair of rings positioned downstream in the diffuser from the first mentioned rings, and means for supporting said second set of rings, the rings of each pair of rings being shaped to divert airflow toward each of the diffuser walls and the rings of the second pair being coaxial with the rings of the first pair with the upstream edges thereof in line approximately with the downstream edges of the corresponding rings of the first pair.

4. The air distributor as defined in claim 3 with the rings of the second pair of longer chord length and less camber than the rings of the first pair.

5. The air distributor as defined in claim 3 with the distance of ring pair displacement being from about the chord length of the first pair to about twice the first pair chord length.

References Cited in the file of this patent

UNITED STATES PATENTS

| | | |
|---|---|---|
| 2,343,560 | Klein et al. | Mar. 7, 1944 |
| 2,414,551 | Pavlecka et al. | Jan. 21, 1947 |
| 2,556,161 | Bailey et al. | June 12, 1951 |
| 2,558,816 | Bruynes | July 3, 1951 |
| 2,570,155 | Redding | Oct. 2, 1951 |
| 2,611,685 | Yoder | Sept. 23, 1952 |